United States Patent
Schauss

(10) Patent No.: US 6,473,242 B2
(45) Date of Patent: Oct. 29, 2002

(54) PROJECTION LENS

(75) Inventor: Udo Schauss, Waldbööckelheim (DE)

(73) Assignee: Josef Schneider Optische Werke GmbH, Bad Kreuznach (DE)

( * ) Notice: Subject to any disclaimer, the term of this patent is extended or adjusted under 35 U.S.C. 154(b) by 0 days.

(21) Appl. No.: 09/851,508

(22) Filed: May 8, 2001

(65) Prior Publication Data

US 2002/0097506 A1 Jul. 25, 2002

(30) Foreign Application Priority Data

Nov. 22, 2000 (DE) .......................................... 100 58 173

(51) Int. Cl.⁷ .................................................. G02B 9/62
(52) U.S. Cl. ........................................ 359/649; 359/757
(58) Field of Search ................................ 359/644, 650, 359/651, 754, 755, 756, 757

(56) References Cited

U.S. PATENT DOCUMENTS

| | | | |
|---|---|---|---|
| 5,099,361 A | * 3/1992 | Yamamoto et al. | 359/754 |
| 5,218,480 A | 6/1993 | Moskovich | 359/753 |
| 5,539,580 A | * 7/1996 | Kim | 359/649 |
| 5,625,495 A | 4/1997 | Moskovich | 359/649 |
| 5,914,818 A | 6/1999 | Tejada et al. | 359/749 |
| 5,969,874 A | 10/1999 | Moskovich | 359/651 |
| 5,969,876 A | 10/1999 | Kreitzer et al. | 359/651 |

* cited by examiner

Primary Examiner—Scott J. Sugarman
(74) Attorney, Agent, or Firm—Collard & Roe, P.C.

(57) ABSTRACT

The projection lens comprises, in order from the object side of the lens to the modulator side of the lens, a first lens group having a positive power, including a positive lens element, a second lens group including a negative meniscus element having a concave surface toward the modulator side, a third lens group having a positive refractive power including a positive lens element or a positive and negative lens element, a fourth lens group including a negative lens element, a fifth lens group including a positive lens element, and a sixth lens group including a positive lens element. The maximum angle between the principal ray emerging from the projection lens and the optical axis on the modulator side of the projection lens is two degrees or less and the projection lens fulfills the following conditions:

$$N_{ave} < 1.73 \quad (1)$$

$$50 < V_{ave} < 70 \quad (2)$$

where $N_{ave}$ is the average value of the index of refraction of the positive lens elements, and $V_{ave}$ is the average value of the Abbe number of the positive lens elements.

4 Claims, 9 Drawing Sheets

Scale : 2.0 : 1

PROJECTION LENS

BACKGROUND OF THE INVENTION

1. Field of the Invention

The present invention relates to a projection lens and more particularly to a projection lens with only a few lens elements. The projection lens has only minimal diameters, a short body and a long back focal distance. The aberrations of the projection lens are well corrected.

2. The Prior Art

There are various well-known types of projection lenses for projectors having three spatial light modulators or digital micromirror devices (DMD). In this kind of protector, the light produced falls on three matrices of micro-mirrors. The micro-mirrors are electronically guided and produce images which consist of three color channels. By means of a prism lens or beam concentrator, the images from the three color channels are combined to provide a single full-color image which is reproduced by the projection lens in enlarged form on a screen.

Because the beam concentrator can direct light to the projection lens only below a certain limiting angle, the projection lens has to be nearly telecentric in order to guarantee an optimal light source efficiency. In addition, the projection lens must have a high optical efficiency in order to produce a bright clear image.

In U.S. Pat. No. 5,914,818, such projection lenses are described. These lenses, however, have very large diameters and long assembly cases, and are for that reason heavy and expensive to manufacture.

In U.S. Pat. No. 5,625,495, a telecentric lens is shown. The lens, however, has too short a back-focal distance to use for the application described.

The projection lenses described in U.S. Pat. Nos. 5,969, 876, 5,218,480 and 5,969,874 largely fail to meet the required condition of telecentricity.

SUMMARY OF THE INVENTION

In accordance with the invention, a lens is produced with small dimensions, high image quality, a small number of lenses, and of small dimensions. The projection lens is nearly telecentric and has a long back focal distance.

By conforming to certain prescribed lens combinations, the maximum angle of the principal ray to the optical axis on the modulator side of the lens amounts to two degrees or less, with the result that the projection lens is approximately telecentric.

Beginning with the object side of the lens, i.e. the side facing the projection screen, the projection lens comprises a positive lens element L1, a negative lens element L2, a positive lens element L3, or lens element group L3 Which in turn comprises a negative lens element L31 and a positive lens element L32, followed by a negative lens element L4, a positive lens element L5, and a positive lens element L6.

BRIEF DESCRIPTION OF THE DRAWINGS

Other objects and features of the present invention will become apparent from the following detailed description considered in conjunction with the accompanying drawings. It should be understood, however, that the drawings are designed for the purpose of illustration only and not as a definition of the limits of the invention.

In the drawing, wherein similar reference characters denote similar elements throughout the several views.

DETAILED DESCRIPTION OF PREFERRED EMBODIMENTS

Figure 1:
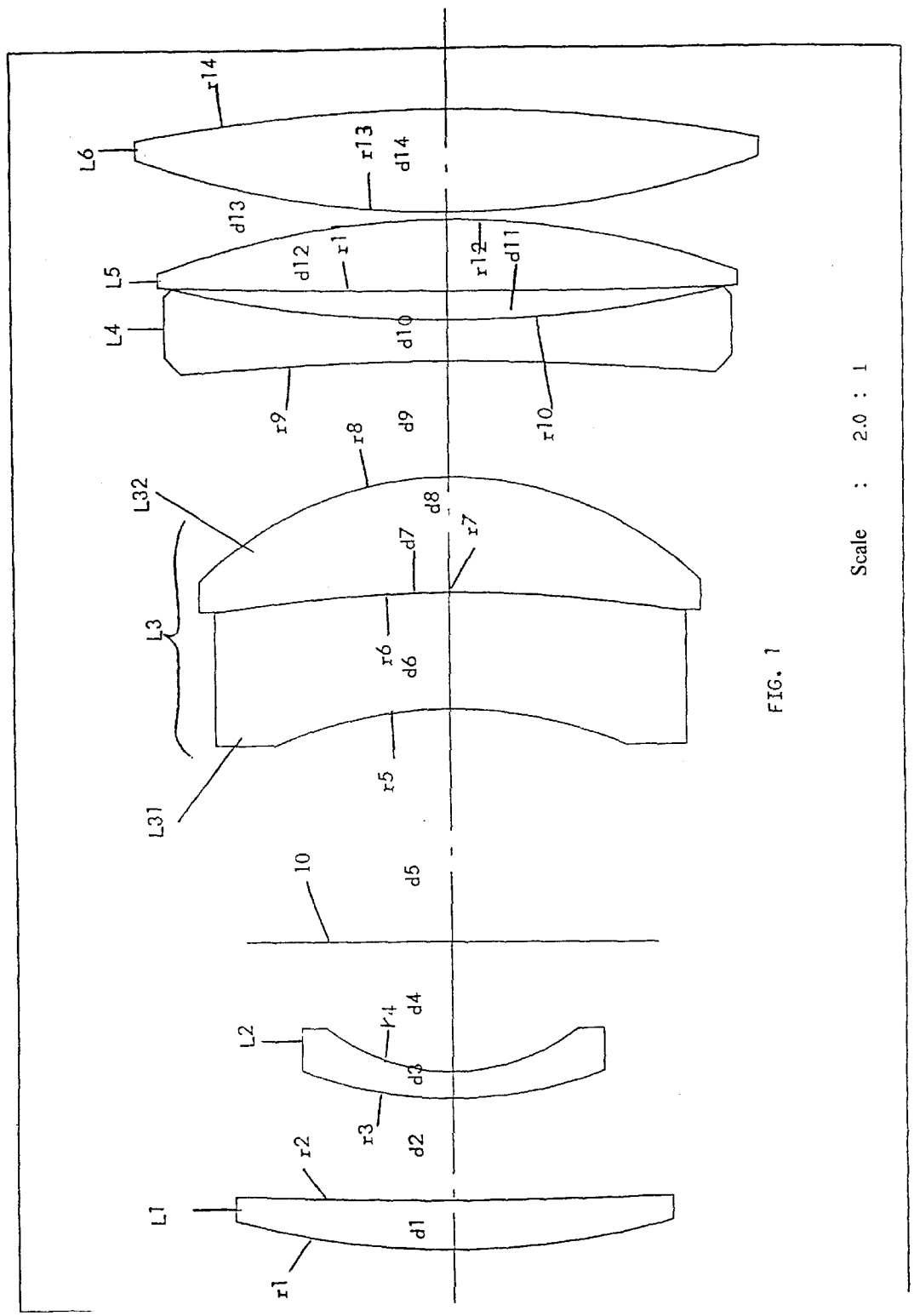
FIG. 1 is a schematic side view of a projection lens assembly constructed according to operational examples 1–3 of the present invention.
Figure 2:
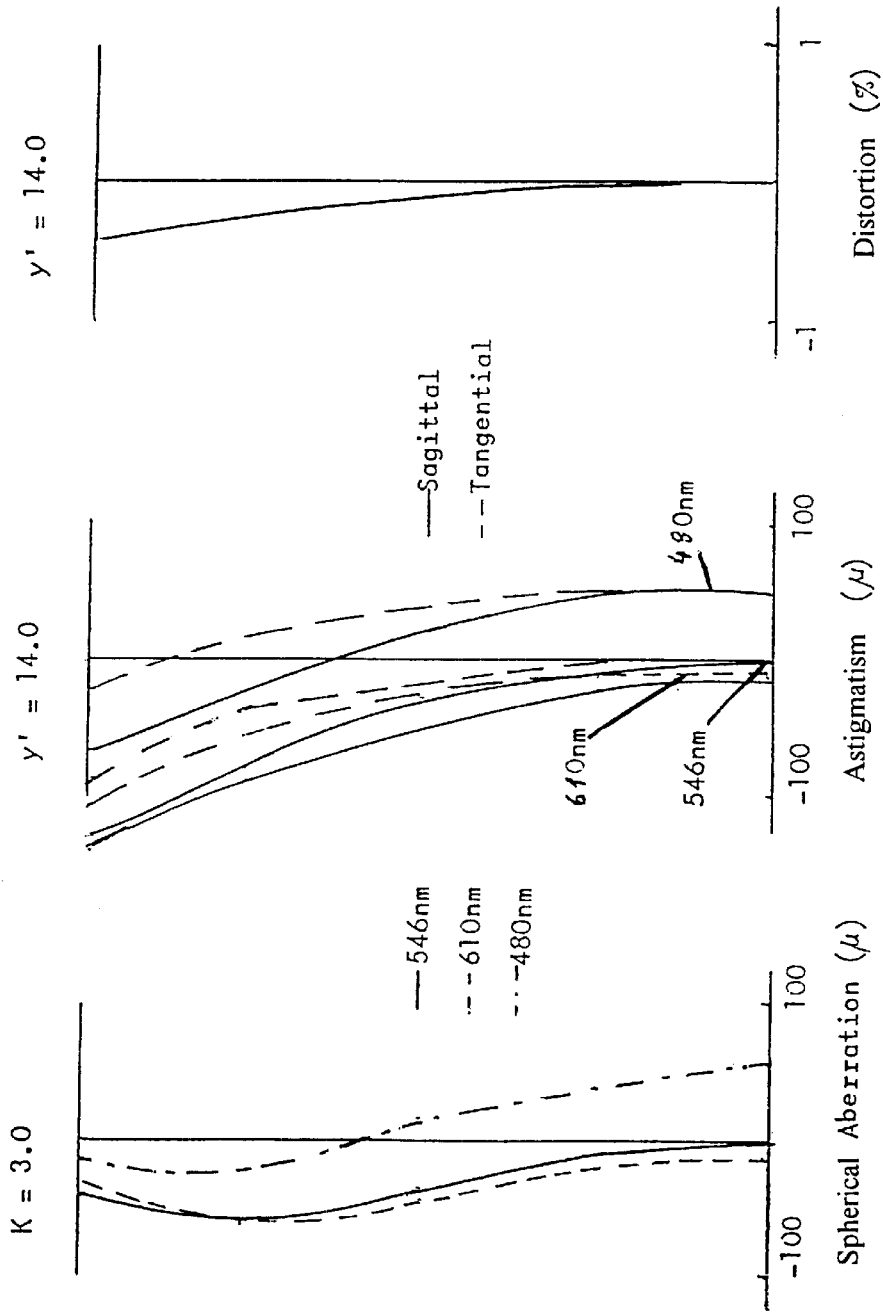
FIG. 2 shows curves of the spherical aberration for wavelengths of 480, 546 and 610 nm, the astigmatism in sagittal and tangential planes, and the distortion of the projection lens constructed according to operational example 1.
Figure 3:
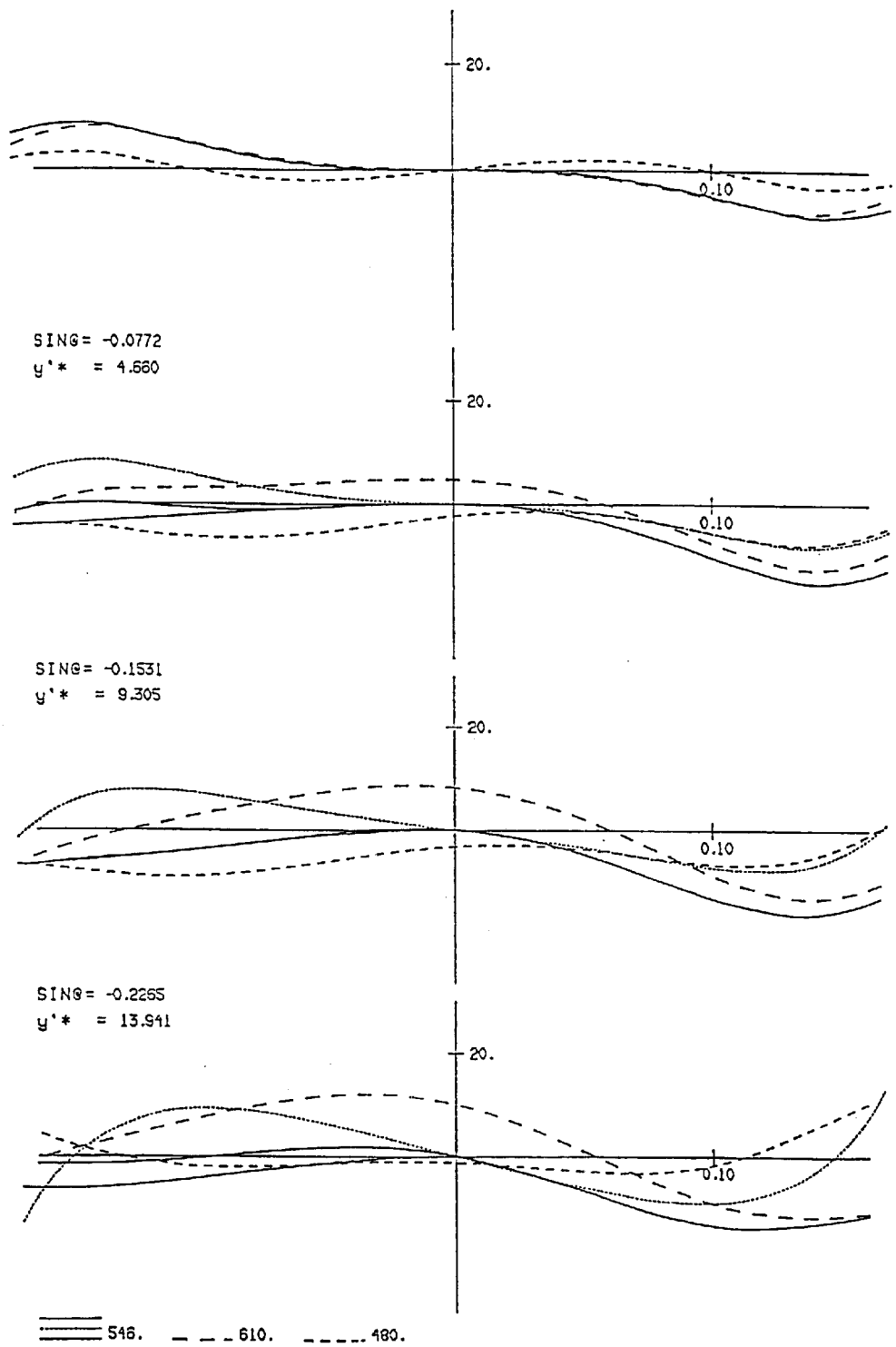
FIG. 3 shows the coma of the projection lens constructed according to operational example 1.
Figure 4:
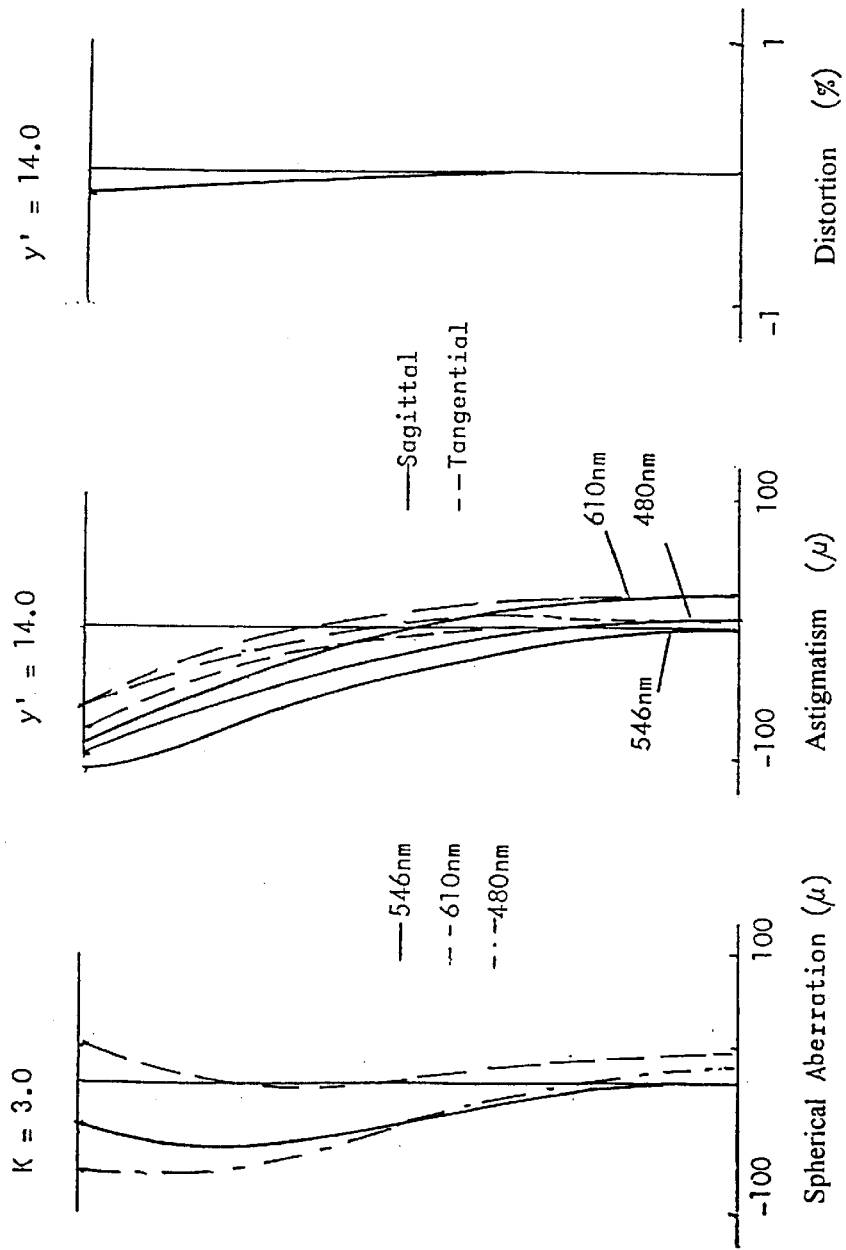
FIG. 4 shows curves of the spherical aberrations for wavelengths of 480, 546 and 610 nm, the astigmatism in sagittal and tangential planes and the distortion of the projection lens constructed according to operational example 2.
Figure 5:
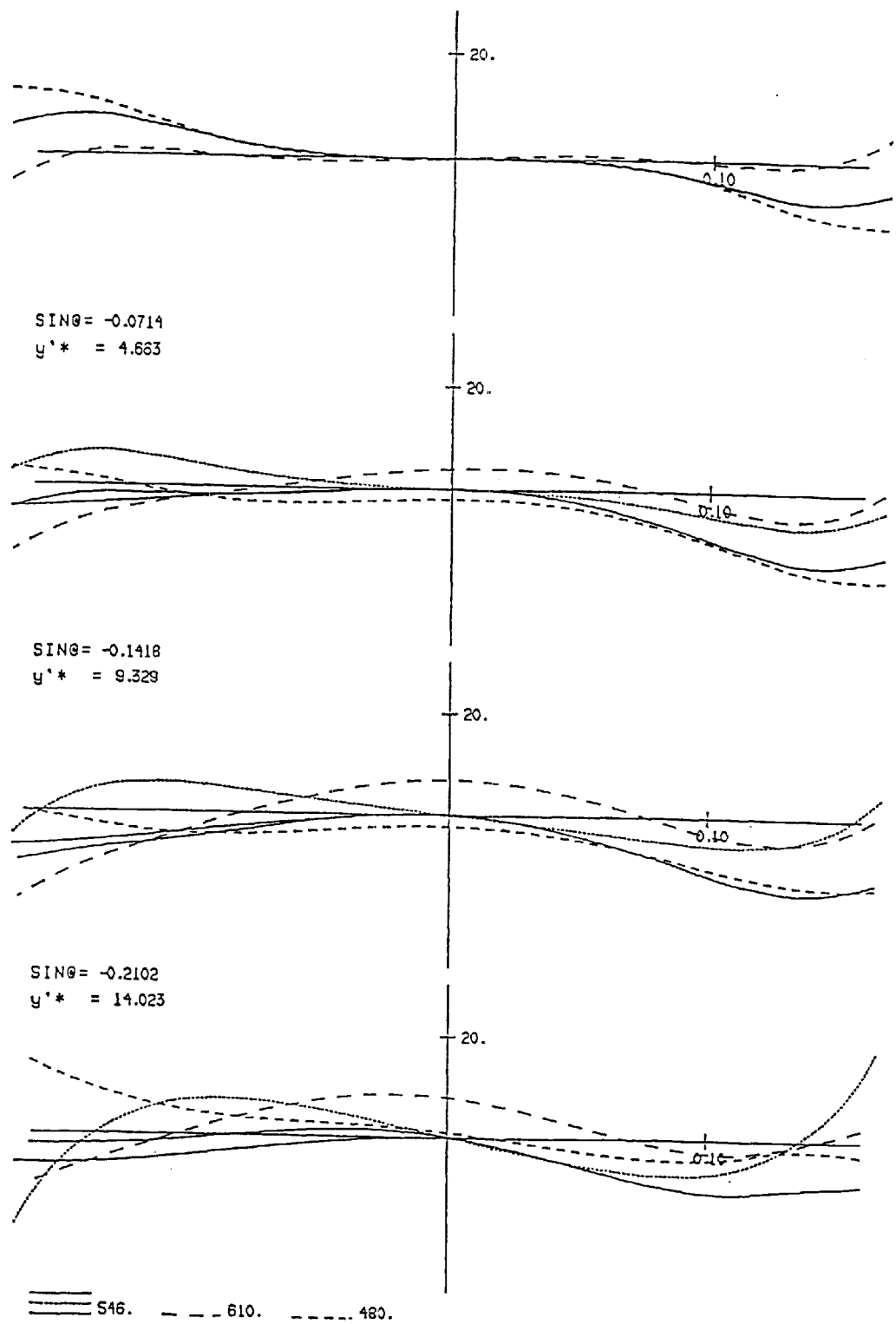
FIG. 5 shows the coma of the projection lens constructed according to operational example 2.
Figure 6:
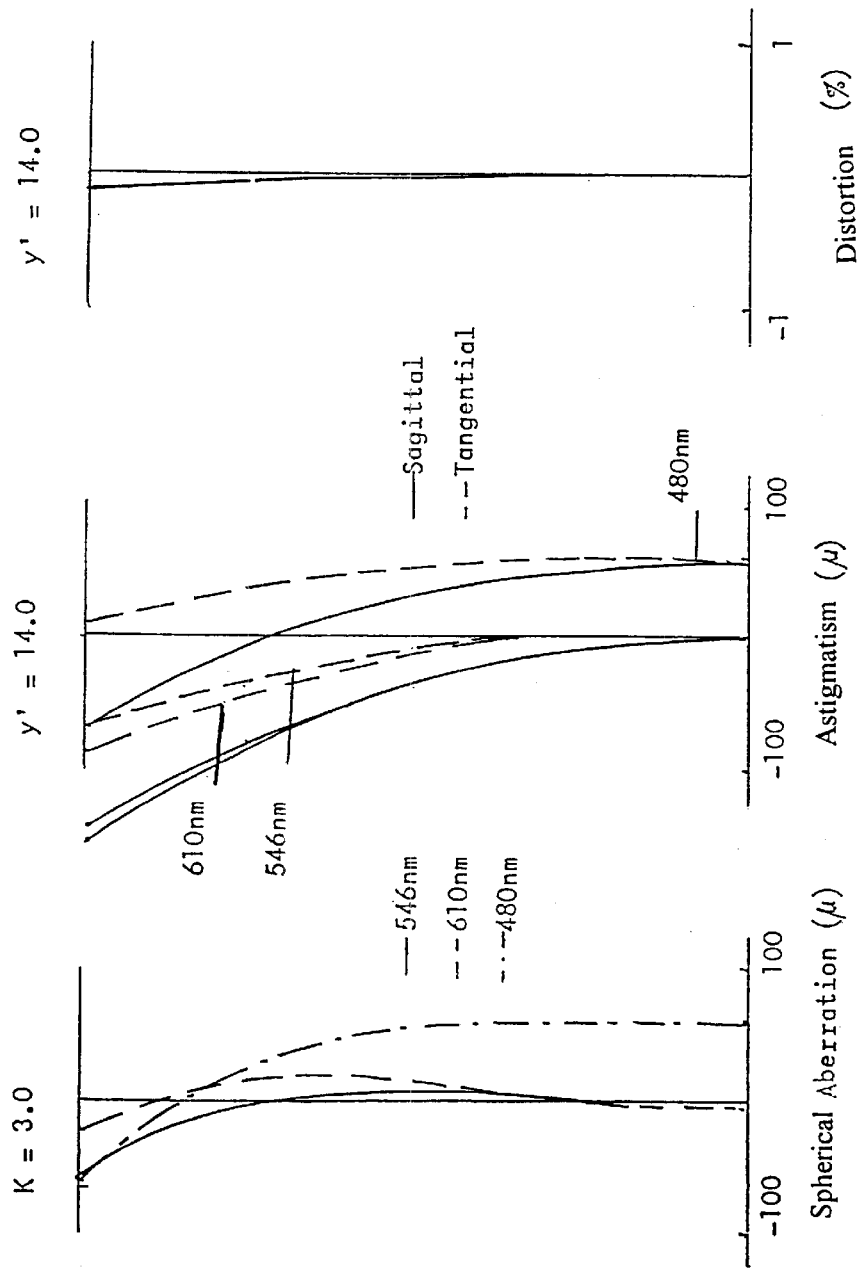
FIG. 6 shows curves of the spherical aberrations for wavelengths of 480, 546 and 610 nm, the astigmatism in sagittal and tangential planes, and the distortion of the projection lens constructed according to operational example 3.
Figure 7:
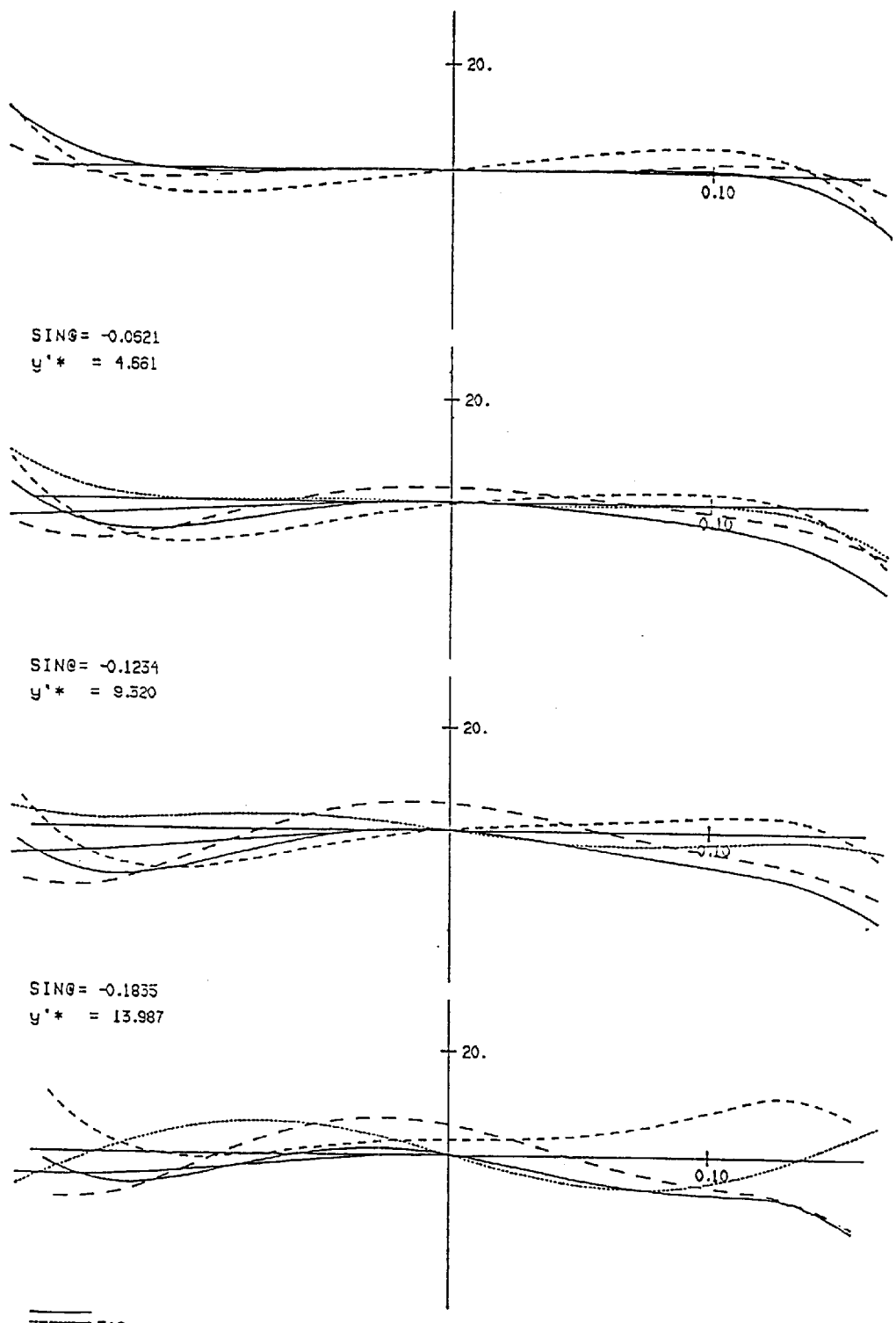
FIG. 7 shows the coma of the projection lens constructed according to operational example 3.

Turning now in detail to the drawings, FIG. 1 shows the basic structure of a projection lens of a preferred embodiment. Projection lens is shown in FIG. 1 with its object side or side facing a projection screen toward the left and its modulator side toward the right.

Beginning with the side facing the projection screen, the projection lens comprises a first lens group having a positive power, including a positive lens element L1, a second lens group including a negative meniscus element L2, a third lens group L3 having a positive refractive power, a fourth lens group including a negative lends element L4, a fifth lens group including a positive lens element L5 and a sixth lens group including a positive lens element L6. An aperture stop 10 separates second lens group L2 from third lens group L3.

Third lens group L3 may consist of a single positive lens element or as shown in FIG. 1 include a negative lens element L31 and a positive lens element L32. The remaining lens groups are each shown consisting of a single element; however, each group may contain a plurality of lens elements.

The projection lens is structured so that the telecentricity on the side toward the DMD or other spatial light modulator device is kept at a level of two degrees or less. In other words, the maximum angle between the principal ray emerging from the projection lens and the optical axis on the modulator side is two degrees or less.

In addition, the projection lens meets the following conditions:

$$50 < V_{ave} < 70 \qquad \text{condition 1:}$$

$$N_{ave} < 1.73 \qquad \text{condition 2:}$$

where $V_{ave}$ represents the average value of the Abbe number of the positive lens elements of the projection lens, and $N_{ave}$ represents the average value of the index of refraction of the positive lens elements of the projection lens.

Preferably, the projection lens meets the following condition as well:

$$d4/f>0.2 \qquad \text{condition 3:}$$

where d4 is the distance or air space between second lens element L2 and third lens group L3, and f is the focal length of the projection lens.

In addition, the following condition is also preferably met:

$$0.18<r4/f<0.45 \qquad \text{condition 4:}$$

where r4 is the radius of curvature of the concave surface of lens element L2, and f is the focal length of the projection lens.

OPERATIONAL EXAMPLES 1–3

The projection lenses in these operational examples have, beginning with the object side, i.e. the side facing the projection screen, the following structure:

First, a positive lens element L1, which consists of a positive meniscus lens whose convex surface is turned toward the screen;

Next, a second lens element L2, which consists of a negative meniscus lens whose convex surface is turned toward the screen;

Next, a positive lens group L3, which consists in turn of a negative meniscus lens L31 and a positive meniscus lens L32, whose concave surfaces are both turned toward the screen;

Next, another lens element L4, consisting of a biconcave lens whose lesser curvature is turned toward the screen;

Next, another lens element L5, which consists of a biconvex lens whose lesser curvature is turned toward the screen; and Finally, lens element L6, which consists of a biconvex lens whose greater curvature is turned toward the screen.

In addition, operational example 1–3 meet the above-mentioned conditions 1 through 4. FIGS. 2–7 illustrate the properties of the projection lenses produced by these examples where Y' is the height from the optical axis and K is the F-stop.

The following Tables 1–3 show the radius of curvature r of each lens, center thickness of each lens or air spacing between neighboring lenses d, and refractive index $N_e$ and abbe number $V_e$.

TABLE 1

| Lens | Surface Radius (r) (mm) | Axial Distance (d) (mm) | $N_e$ | $V_e$ |
|---|---|---|---|---|
| $L_1$ | $r_1$: 78.384 | 4.94 | 1.79179 | 25.87 |
|  | $r_2$: 562.587 | 1.58 |  |  |
| $L_2$ | $r_3$: 41.942 | 3.17 | 1.75844 | 52.09 |
|  | $r_4$: 20.235 | 12.50 |  |  |
|  | DIAPHRAGM | 23.22 |  |  |
| $L_3$ | $r_5$: −43.355 | 11.62 | 1.61669 | 44.05 |
|  | $r_6$: −148.966 | 0.02 |  |  |
|  | $r_7$: −147.165 | 11.37 | 1.59446 | 68.02 |
|  | $r_8$: −34.892 | 11.30 |  |  |

TABLE 1-continued

| Lens | Surface Radius (r) (mm) | Axial Distance (d) (mm) | $N_e$ | $V_e$ |
|---|---|---|---|---|
| $L_4$ | $r_9$: −304.558 | 3.95 | 1.76167 | 27.37 |
|  | $r_{10}$: 115.937 | 2.97 |  |  |
| $L_5$ | $r_{11}$: 908.371 | 6.92 | 1.59446 | 68.02 |
|  | $r_{12}$: −82.687 | 0.8 |  |  |
| $L_6$ | $r_{13}$: 90.233 | 9.88 | 1.59446 | 68.02 |
|  | $r_{14}$: −168.25 | 1. |  |  |
|  | INFINITY | 102.5 | 1.51872 | 63.96 |
|  | INFINITY | 3.0 | 1.51045 | 60.98 |
|  | INFINITY | 0. |  |  |

Focal length = 60.2 mm - Focal distance in air = 94.26 mm (without beam concentrator)

TABLE 2

| Lens | Surface Radius (r) (mm) | Axial Distance (d) (mm) | $N_e$ | $V_e$ |
|---|---|---|---|---|
| $L_1$ | $r_1$: 79.052 | 4.94 | 1.81184 | 33.03 |
|  | $r_2$: 485.537 | 10.0 |  |  |
| $L_2$ | $r_3$: 41.942 | 2.60 | 1.75844 | 52.09 |
|  | $r_4$: 20.235 | 12.90 |  |  |
|  | DIAPHRAGM | 23.22 |  |  |
| $L_3$ | $r_5$: −43.355 | 11.55 | 1.62541 | 56.60 |
|  | $r_6$: −148.966 | 0.02 |  |  |
|  | $r_7$: −147.165 | 11.37 | 1.59446 | 68.02 |
|  | $r_8$: −34.892 | 11.30 |  |  |
| $L_4$ | $r_9$: −304.558 | 3.95 | 1.76167 | 27.37 |
|  | $r_{10}$: 115.937 | 2.97 |  |  |
| $L_5$ | $r_{11}$: 908.371 | 6.92 | 1.59446 | 68.02 |
|  | $r_{12}$: −82.687 | 0.8 |  |  |
| $L_6$ | $r_{13}$: 90.233 | 9.88 | 1.59446 | 68.02 |
|  | $r_{14}$: −168.25 | 1. |  |  |
|  | INFINITY | 102.5 | 1.51872 | 63.96 |
|  | INFINITY | 3.0 | 1.51034 | 60.98 |
|  | INFINITY | 0. |  |  |

Focal length = 65.1 mm - Focal distance in air = 93.66 mm (without beam concentrator)

TABLE 3

| Lens | Surface Radius (r) (mm) | Axial Distance (d) (mm) | $N_e$ | $V_e$ |
|---|---|---|---|---|
| $L_1$ | $r_1$: 45.620 | 4.94 | 1.75458 | 34.71 |
|  | $r_2$: 188.841 | 1.98 |  |  |
| $L_2$ | $r_3$: 45.808 | 3.07 | 1.760764 | 47.64 |
|  | $r_4$: 21.248 | 10.50 |  |  |
|  | DIAPHRAGM | 25.22 |  |  |
| $L_3$ | $r_5$: −35.052 | 11.69 | 1.60899 | 43.62 |
|  | $r_6$: −145.120 | 0.02 |  |  |
|  | $r_7$: −143.412 | 11.37 | 1.59446 | 68.02 |
|  | $r_8$: −34.459 | 11.30 |  |  |
| $L_4$ | $r_9$: −2860.00 | 5.95 | 1.76167 | 27.37 |
|  | $r_{10}$: 100.289 | 4.97 |  |  |
| $L_5$ | $r_{11}$: 2159.83 | 6.92 | 1.59446 | 68.02 |
|  | $r_{12}$: −105.04 | 0.2 |  |  |
| $L_6$ | $r_{13}$: 91.615 | 10.8 | 1.59446 | 68.02 |
|  | $r_{14}$: −157.292 | 1. |  |  |
|  | INFINITY | 102.5 | 1.51872 | 63.96 |
|  | INFINITY | 3. | 1.51045 | 60.98 |
|  | INFINITY | 0. |  |  |

Focal length = 75.0 mm - Focal distance in air = 96.68 mm (without beam concentrator)

OPERATIONAL EXAMPLE 4

The projection lens in this operational example has, beginning with the side facing the projection screen, the following structure:

First, a positive lens element L1, which consists of a positive meniscus lens, whose convex surface is turned toward the screen;

Next, a second lens element L2, which consists of a negative meniscus lens, whose convex surface is turned toward the screen;

Next, a positive lens element L3, which consists of a positive meniscus lens, whose concave surface is turned toward the screen;

Next, another lens element L4, consisting of a biconcave lens, whose lesser curvature is turned toward the screen;

Next, another lens element L5, which consists of a biconvex lens, whose lesser curvature is turned toward the screen; and Finally, lens element L6, which consists of a biconvex lens, whose greater curvature is turned toward the screen.

Figure 8:
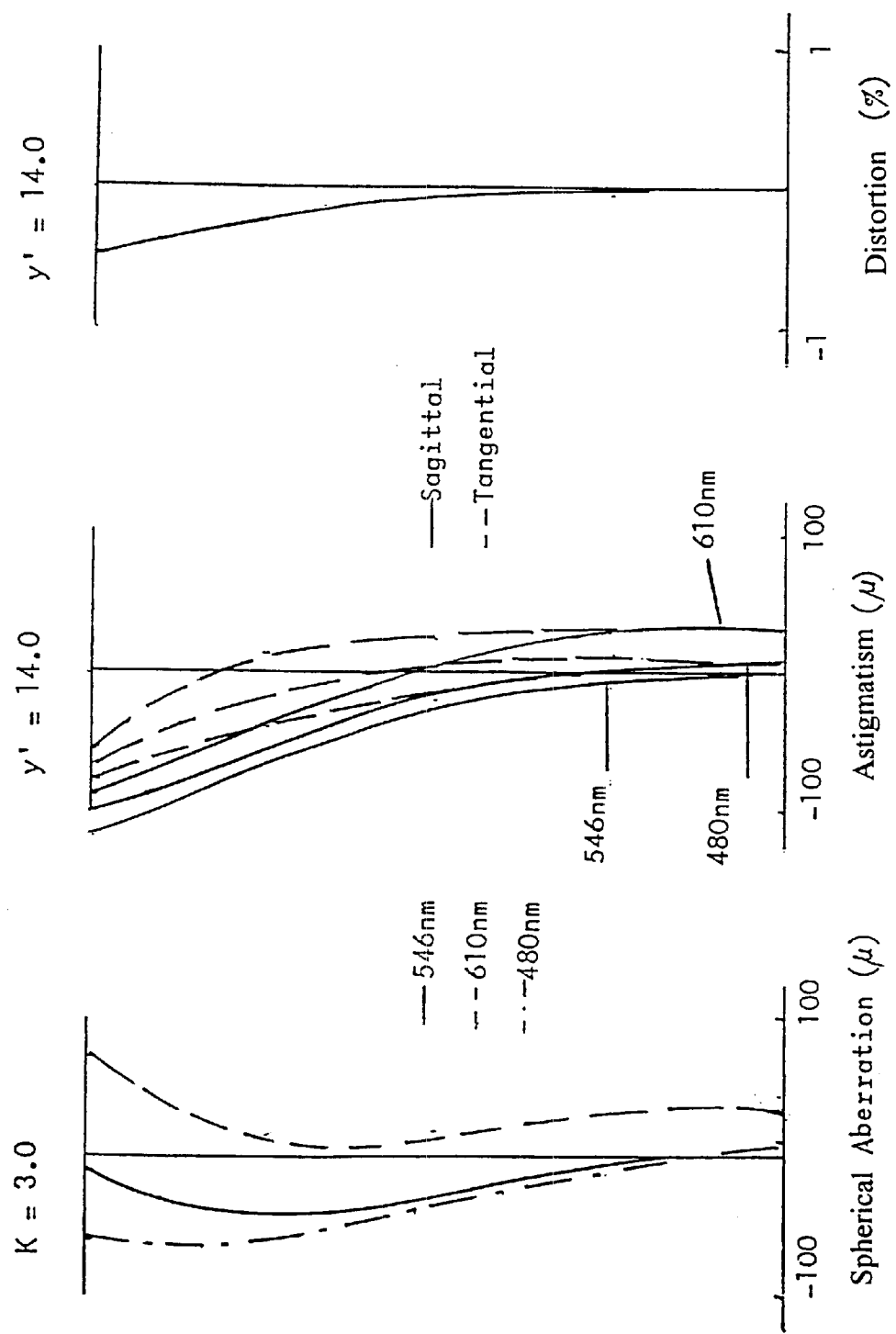
FIG. 8 shows curves of the spherical aberrations for wavelengths of 480, 546 and 610 nm, the astigmatism in sagittal and tangential planes, and the distortion of the projection lens constructed according to operational example 4.
Figure 9:
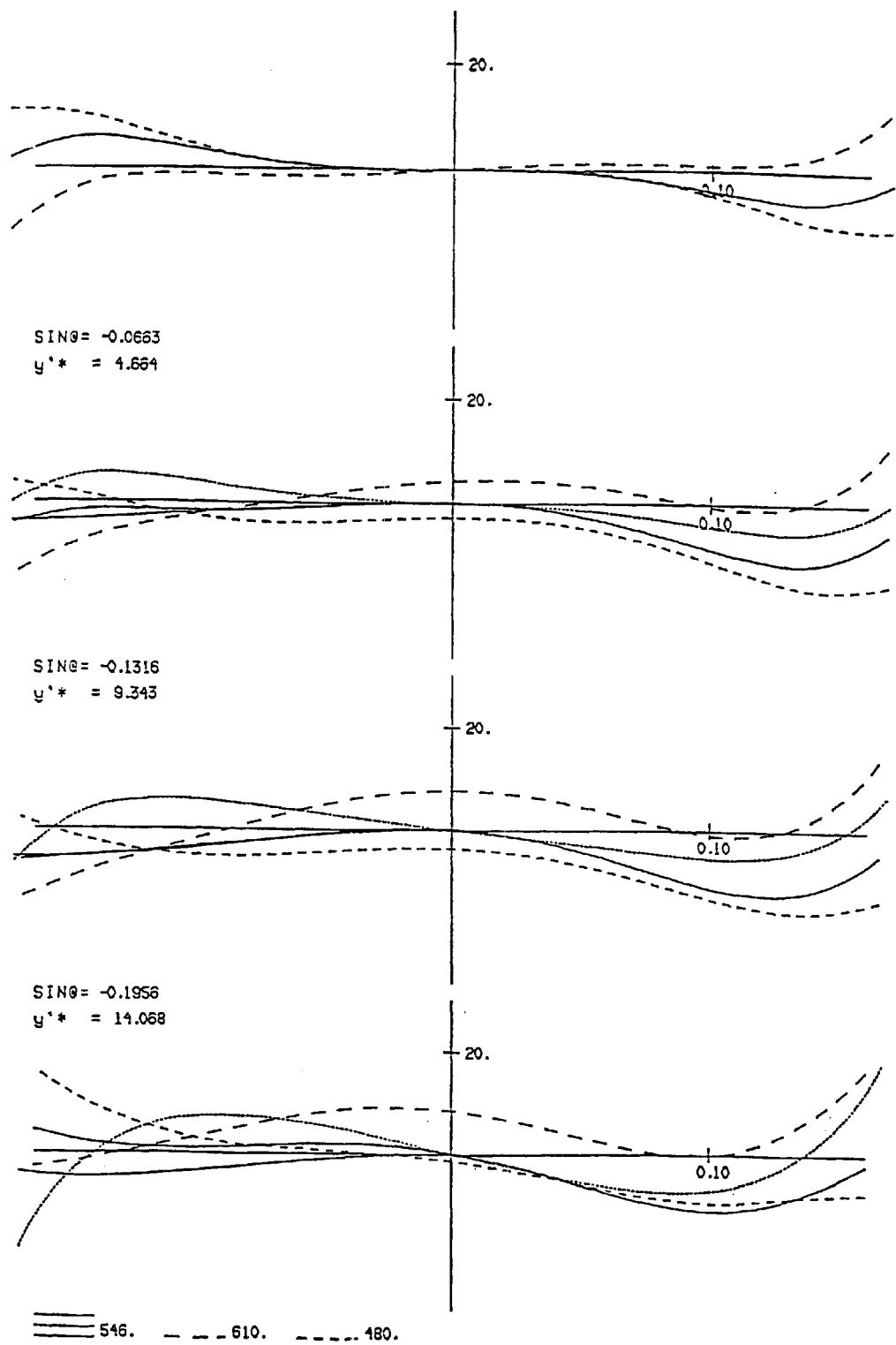
FIG. 9 shows the coma of the projection lens constructed according to operational example 4.

In addition, operational example 4 meets the above-mentioned conditions 1 through 4. FIGS. 8 and 9 illustrate the properties of the projection lens produced by this example where Y' is the height from the optical axis and K is the F-stop.

As in Tables 1–3, Table 4 shows the radius of curvature r of each surface, the axial distance between surfaces d, the index of refraction $N_e$ and Abbe number $V_e$.

TABLE 4

| Lens | Surface Radius (r) (mm) | Axial Distance (d) (mm) | $N_e$ | $V_e$ |
|---|---|---|---|---|
| $L_1$ | 79.052 | 4.44 | 1.80401 | 41.98 |
|  | 482.175 | 17.20 |  |  |
| $L_2$ | 41.253 | 2.90 | 1.75844 | 52.09 |
|  | 20.235 | 11.95 |  |  |
|  | DIAPHRAGM | 23.21 |  |  |
| $L_3$ | −42.061 | 23.10 | 1.59446 | 68.02 |
|  | −34.892 | 11.17 |  |  |
| $L_4$ | −304.558 | 3.95 | 1.76167 | 27.37 |
|  | 115.937 | 2.97 |  |  |
| $L_5$ | 908.371 | 6.92 | 1.59446 | 68.02 |
|  | −82.687 | 0.8 |  |  |
| $L_6$ | 90.233 | 9.88 | 1.59446 | 68.02 |
|  | −168.25 | 1. |  |  |
|  | INFINITY | 102.5 | 1.51872 | 63.96 |
|  | INFINITY | 3.0 | 1.51045 | 60.98 |
|  | INFINITY | 0. |  |  |

Focal length = 70.2 mm - Focal distance in air = 90.55 mm (without beam concentrator)

Additional data for each of the operational examples 1 through 4 is detailed in Table 5.

TABLE 5

|  | Operational Example 1 | Operational Example 2 | Operational Example 3 | Operational Example 4 |
|---|---|---|---|---|
| Projection angle (degrees) | 13.1 | 12.1 | 10.6 | 11.2 |
| Telecentric angle of view (degrees) | 0.5 | 0.5 | 0.4 | 0.4 |
| Brightness in the corner of the image (%) | 94 | 94 | 93 | 94 |
| Condition 1 | 57 | 59 | 60 | 61.5 |
| Condition 2 | 1.64 | 1.65 | 1.63 | 1.65 |
| Condition 3 | 0.59 | 0.55 | 0.47 | 0.50 |
| Condition 4 | 0.33 | 0.31 | 0.28 | 0.29 |

TABLE 5-continued

|  | Operational Example 1 | Operational Example 2 | Operational Example 3 | Operational Example 4 |
|---|---|---|---|---|

Table 5 shows each of the four operational examples meets each of the conditions given above.

Accordingly, while a few embodiments of the present invention have been shown and described, it is to be understood that many changes and modifications may be made thereunto without departing from the spirit and scope of the invention as defined in the appended claims.

What is claimed is:

1. A projection lens having an optical axis comprising, in order from an object side of the lens to a modulator side of the lens:

(a) a first lens group having a positive power including a positive lens element;

(b) a second lens group including a negative meniscus element, having a concave surface toward the modulator side, wherein the second lens group fulfills the following conditions:

$$0.18 < r_4/f < 0.45$$

where
    $r_4$ is the radius of curvature of the concave surface of the negative meniscus element of the second lens group; and
    f is the focal length of the projection lens;

(c) a third lens group having a positive refractive power including a positive lens element;

(d) a fourth lens group having a negative lens element;

(e) a fifth lens group including a positive lens element; and (f) a sixth lens group including a positive lens element;
    wherein the maximum angle between a principal ray emerging from the projection lens and the optical axis on the modulator side of the projection lens is 2 degrees or less and the projection lens fulfills the following conditions:

$$N_{ave} < 1.73 \tag{1}$$
$$50 < V_{ave} < 70 \tag{2}$$

where
    $N_{ave}$ is the average value of the index of refraction of said positive lens elements, and
    $V_{ave}$ is the average value of the Abbe number of said positive lens elements.

2. The projection lens of claim 1 wherein the third lens group further includes a negative lens element.

3. The projection lens of claim 1 wherein:

$$d_4/f > 0.2,$$

where
    $d_4$ is the air space between the second and third lens groups, and f is the focal length of the projection lens.

4. The projection lens of claim 1 wherein the maximum angle between the principal ray and the optical axis on the object side is no greater than 2 degrees.

* * * * *